(12) United States Patent
Liu et al.

(10) Patent No.: US 10,942,263 B2
(45) Date of Patent: Mar. 9, 2021

(54) PORTABLE RADAR SENSING DEVICE

(71) Applicant: Man-Chee Liu, Taipei (TW)

(72) Inventors: Man-Chee Liu, Taipei (TW); Wei-Chu Shih, Taipei (TW); Yuan-Huei Chang, Taipei (TW)

(73) Assignee: Man-Chee Liu, Taipei (TW)

( * ) Notice: Subject to any disclaimer, the term of this patent is extended or adjusted under 35 U.S.C. 154(b) by 611 days.

(21) Appl. No.: 15/808,043

(22) Filed: Nov. 9, 2017

(65) Prior Publication Data

US 2019/0056487 A1 Feb. 21, 2019

(30) Foreign Application Priority Data

Aug. 17, 2017 (TW) .................................. 10621221.2

(51) Int. Cl.
*G01S 13/42* (2006.01)
*G01S 13/86* (2006.01)
*G01S 13/88* (2006.01)
*G01S 13/89* (2006.01)

(52) U.S. Cl.
CPC ............ *G01S 13/426* (2013.01); *G01S 13/86* (2013.01); *G01S 13/865* (2013.01); *G01S 13/867* (2013.01); *G01S 13/88* (2013.01); *G01S 13/89* (2013.01)

(58) Field of Classification Search
CPC ...... G01S 13/426; G01S 13/86; G01S 13/865; G01S 13/867; G01S 13/88; G01S 13/89
USPC ...................................................... 342/53, 21
See application file for complete search history.

(56) References Cited

U.S. PATENT DOCUMENTS

2015/0168546 A1\* 6/2015 Nakagawa .............. G01S 7/282
342/21

\* cited by examiner

*Primary Examiner* — Bo Fan
(74) *Attorney, Agent, or Firm* — Guice Patents PLLC

(57) ABSTRACT

A portable radar sensing device comprises: a millimeter-wave MIMO radar unit; a control unit, including at least one processor and at least one memory; at least one information outputting unit; and an operation interface; wherein the control unit is coupled to the millimeter-wave MIMO radar unit, the at least one information outputting unit and the operation interface for processing a biological detecting operation, and the biological detecting operation includes a space scanning operation and a biological target scanning operation.

2 Claims, 8 Drawing Sheets

PORTABLE RADAR SENSING DEVICE

BACKGROUND OF THE INVENTION

1. Field of the Invention

The present invention relates to a portable radar sensing device used in a disaster relief operation.

2. Description of Related Art

A conventional life detecting equipment used in a disaster relief operation has shortages of large volume, not easy to be carried around or moved.

In addition, even if the conventional life detecting equipment detects a target having vital signs, the biological type, the amount and the relative location of the target in the disaster scene are unable to be precisely determined.

For solving the above-mentioned disadvantages, a novel sensing device used in a disaster relief operation shall be developed.

SUMMARY OF THE INVENTION

One primary objective of the present invention is to provide a portable radar sensing device, in which a millimeter-wave MIMO (multiple-input-multiple-output) radar unit is utilized for detecting the relative location of a biological target to be rescued in a disaster scene.

Another objective of the present invention is to provide a portable radar sensing device, in which the combination of a millimeter-wave MIMO radar unit and a TOF (time-of-flight) laser unit is utilized for detecting the relative location of a biological target to be rescued in a disaster scene.

One another objective of the present invention is to provide a portable radar sensing device, in which the combination of a millimeter-wave MIMO radar unit and an acceleration sensing unit is utilized for detecting the relative location of a biological target to be rescued in a disaster scene.

Still one another objective of the present invention is to provide a portable radar sensing device, in which the combination of a millimeter-wave MIMO radar unit, a TOF laser unit and an acceleration sensing unit is utilized for detecting the relative location of a biological target to be rescued in a disaster scene.

Still one another objective of the present invention is to provide a portable radar sensing device, in which the combination of a millimeter-wave MIMO radar unit and a thermal image sensing unit is utilized for detecting the relative location of a biological target to be rescued in a disaster scene.

Still one another objective of the present invention is to provide a portable radar sensing device, in which the combination of a millimeter-wave MIMO radar unit, a TOF laser unit and a thermal image sensing unit is utilized for detecting the relative location of a biological target to be rescued in a disaster scene.

Still one another objective of the present invention is to provide a portable radar sensing device, in which the combination of a millimeter-wave MIMO radar unit, an acceleration sensing unit and a thermal image sensing unit is utilized for detecting the relative location of a biological target to be rescued in a disaster scene.

Still one another objective of the present invention is to provide a portable radar sensing device, in which the combination of a millimeter-wave MIMO radar unit, a TOF laser unit, an acceleration sensing unit and a thermal image sensing unit is utilized for detecting the relative location of a biological target to be rescued in a disaster scene.

Still one another objective of the present invention is to provide a portable radar sensing device, in which an augmented reality image is utilized for making a certain mark in a disaster scene to help the rescue personnel easily detect a biological target to be rescued.

Still one another objective of the present invention is to provide a portable radar sensing device, in which an artificial intelligence module is utilized for processing a biological detecting operation.

For achieving said objectives, the present invention provides a portable radar sensing device, which comprises:
a millimeter-wave MIMO radar unit;
a control unit, including at least one processor and at least one memory;
at least one information outputting unit; and
an operation interface;
wherein the control unit is coupled to the millimeter-wave MIMO radar unit, the at least one information outputting unit and the operation interface for processing a biological detecting operation, and the biological detecting operation includes a space scanning operation and a biological target scanning operation.

According to one embodiment of the present invention, the at least one information outputting unit includes a displayer and/or a speaker.

According to one embodiment of the present invention, the operation interface includes a button unit and/or a touch control unit.

According to one embodiment of the present invention, the at least one memory is served to store a biometric characteristic database.

According to one embodiment of the present invention, the space scanning operation is served to generate a space map according to a plurality of outputted signals of the millimeter-wave MIMO radar unit.

According to one embodiment of the present invention, the biological target scanning operation is served to identify at least one biological target in the space map according to the plural outputted signals of the millimeter-wave MIMO radar unit.

For achieving said objectives, the present invention provides a portable radar sensing device, which comprises:
a millimeter-wave MIMO radar unit;
a TOF laser unit;
a control unit, including at least one processor and at least one memory;
at least one information outputting unit; and
an operation interface;
wherein the control unit is coupled to the millimeter-wave MIMO radar unit, the TOF laser unit, the at least one information outputting unit and the operation interface for processing a biological detecting operation, and the biological detecting operation includes a space scanning operation and a biological target scanning operation.

For achieving said objectives, the present invention provides a portable radar sensing device, which comprises:
a millimeter-wave MIMO radar unit;
an acceleration sensing unit;
a control unit, including at least one processor and at least one memory;
at least one information outputting unit; and
an operation interface;
wherein the control unit is coupled to the millimeter-wave MIMO radar unit, the acceleration sensing unit, the at least one information outputting unit and the operation interface for processing a biological detecting operation, and the biological detecting operation includes a space scanning operation and a biological target scanning operation.

For achieving said objectives, the present invention provides a portable radar sensing device, which comprises:
a millimeter-wave MIMO radar unit;
a TOF laser unit;
an acceleration sensing unit;
a control unit, including at least one processor and at least one memory;
at least one information outputting unit; and
an operation interface;
wherein the control unit is coupled to the millimeter-wave MIMO radar unit, the TOF laser unit, the acceleration sensing unit, the at least one information outputting unit and the operation interface for processing a biological detecting operation, and the biological detecting operation includes a space scanning operation and a biological target scanning operation.

According to one embodiment of the present invention, the portable radar sensing device further includes a thermal image sensing unit.

For fully disclosing the structure, the characteristic and the objective of the present invention, one preferred embodiment with reference to figures is provided hereinafter for detailed illustration.

DETAILED DESCRIPTION OF THE PREFERRED EMBODIMENT

Figure 1:
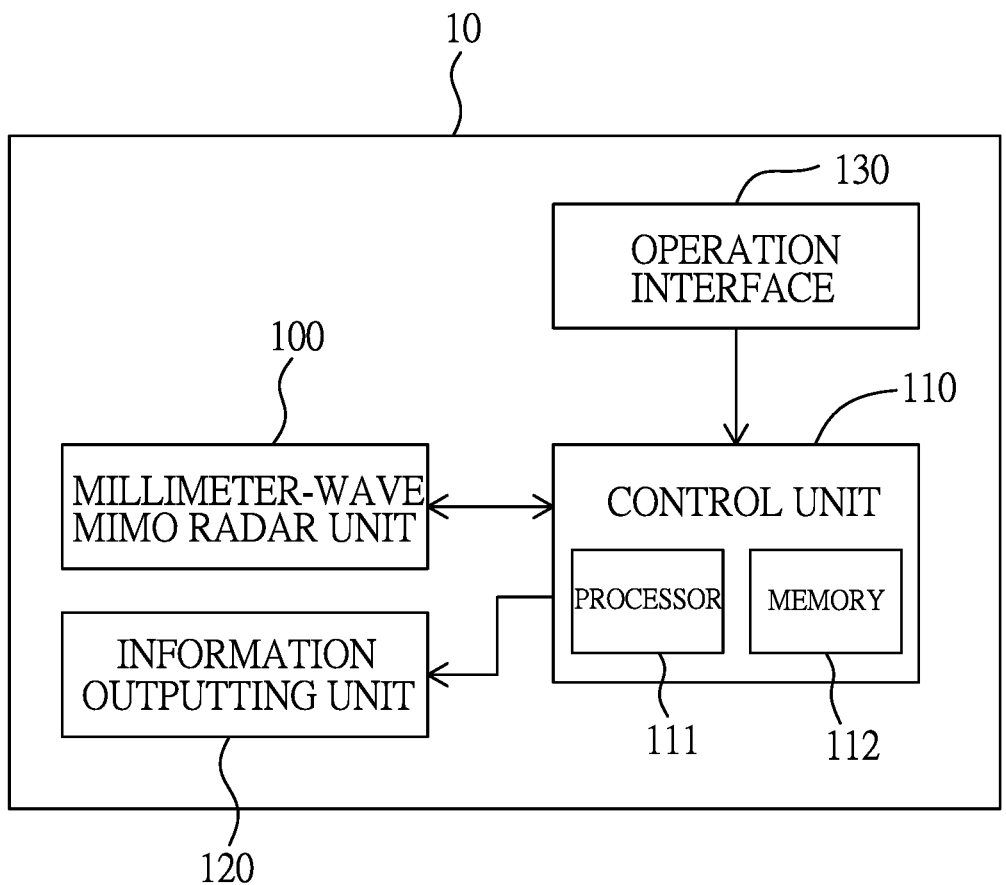
FIG. 1 is a block diagram illustrating the portable radar sensing device according to one embodiment of the present invention.

Please refer to FIG. 1, which is a block diagram illustrating the portable radar sensing device according to one embodiment of the present invention. As shown in FIG. 1, the present invention provides a portable radar sensing device 10, which comprises a millimeter-wave MIMO radar unit 100, a control unit 110, at least one information outputting unit 120 and an operation interface 130.

The working frequency range of the millimeter-wave MIMO radar unit 100 is in a millimeter range and preferably to be (but not limited to) 30 GHz to 300 GHz, and the millimeter-wave MIMO radar unit 100 is capable of measuring the distance and the relative velocity of an target and the micro movement of the target.

The control unit 110 includes at least one processor 111 and at least one memory 112, wherein the at least one memory 112 is served to store a biometric characteristic database for enabling the control unit 110 to identify the biological type of the target.

The information outputting unit 120 includes a displayer and/or a speaker.

The operation interface 130 includes a button unit and/or a touch control unit.

Wherein, the control unit 110 is coupled to the millimeter-wave MIMO radar unit 100, the at least one information outputting unit 120 and the operation interface 130 for processing a biological detecting operation, the biological detecting operation includes a space scanning operation and a biological target scanning operation. The space scanning operation is served to generate a space map according to a plurality of outputted signals of the millimeter-wave MIMO radar unit 100; and the biological target scanning operation is served to identify at least one biological target in the space map according to the plural outputted signals of the millimeter-wave MIMO radar unit 100. In addition, the control unit 110 can enable the displayer to display an augmented reality image for making a certain mark in a disaster scene to help the rescue personnel easily detect the biological target to be rescued. Moreover, the control unit 110 includes an artificial intelligence module for processing the biological detecting operation. Furthermore, the portable radar sensing device 10 can be worn on the rescue personnel.

Figure 2:
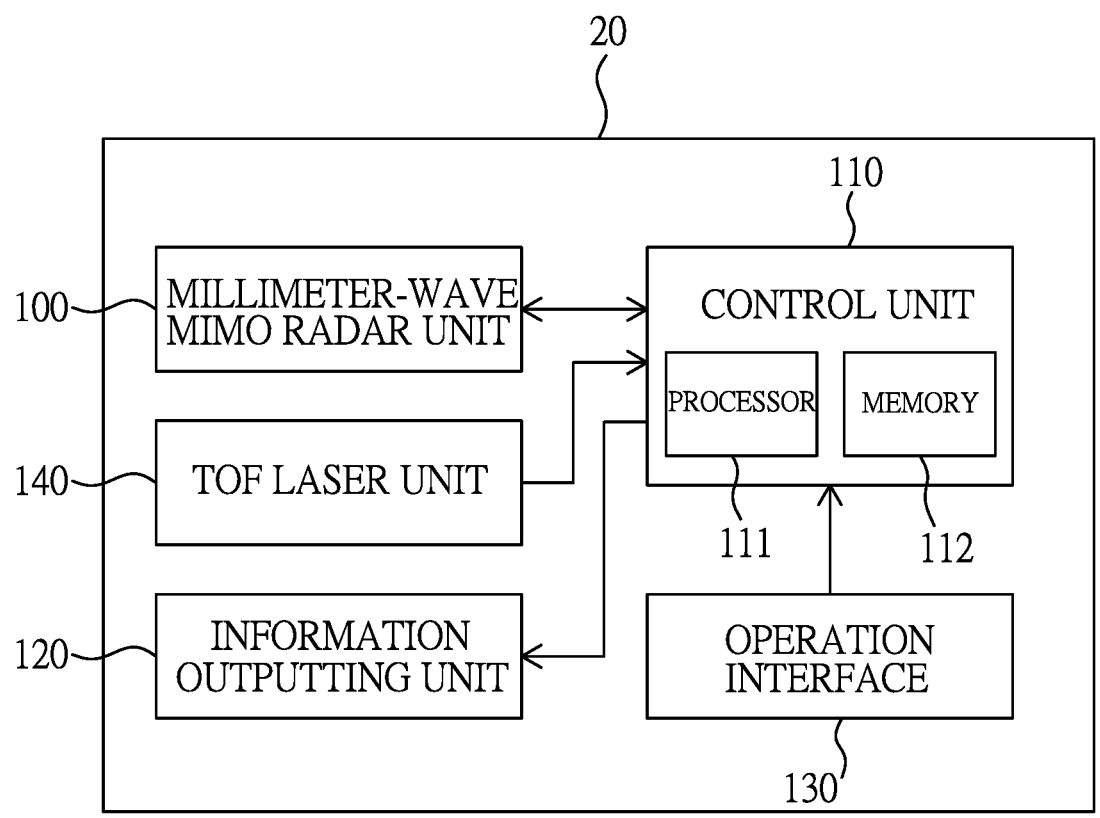
FIG. 2 is a block diagram illustrating the portable radar sensing device according to another embodiment of the present invention.

Please refer to FIG. 2, which is a block diagram illustrating the portable radar sensing device according to another embodiment of the present invention. As shown in FIG. 2, a portable radar sensing device 20 comprises a millimeter-wave MIMO radar unit 100, a control unit 110, at least one information outputting unit 120, an operation interface 130 and a TOF laser unit 140.

Because the functions of the millimeter-wave MIMO radar unit 100, the information outputting unit 120 and the operation interface 130 have already been illustrated in the prior embodiment with reference to FIG. 1, no further illustration is provided.

The control unit 110 includes at least one processor 111 and at least one memory 112. When in operation, the control unit 110 is coupled to the millimeter-wave MIMO radar unit 100, the TOF laser unit 140, the at least one information outputting unit 120 and the operation interface 130 for processing a biological detecting operation, and the biological detecting operation includes a space scanning operation and a biological target scanning operation. The space scanning operation is served to generate a space map according to a plurality of outputted signals of the millimeter-wave MIMO radar unit 100 and a plurality of outputted signals of the TOF laser unit 140. The biological target scanning operation is served to identify at least one biological target in the space map according to the plural outputted signals of the millimeter-wave MIMO radar unit 100 and the plural outputted signals of the TOF laser unit 140. In addition, the control unit 110 can enable the displayer to display an augmented reality image for making a certain mark in a disaster scene to help the rescue personnel easily detect the biological target to be rescued. Moreover, the control unit 110 includes an artificial intelligence module for processing the biological detecting operation. Furthermore, the portable radar sensing device 20 can be worn on the rescue personnel.

Figure 3:
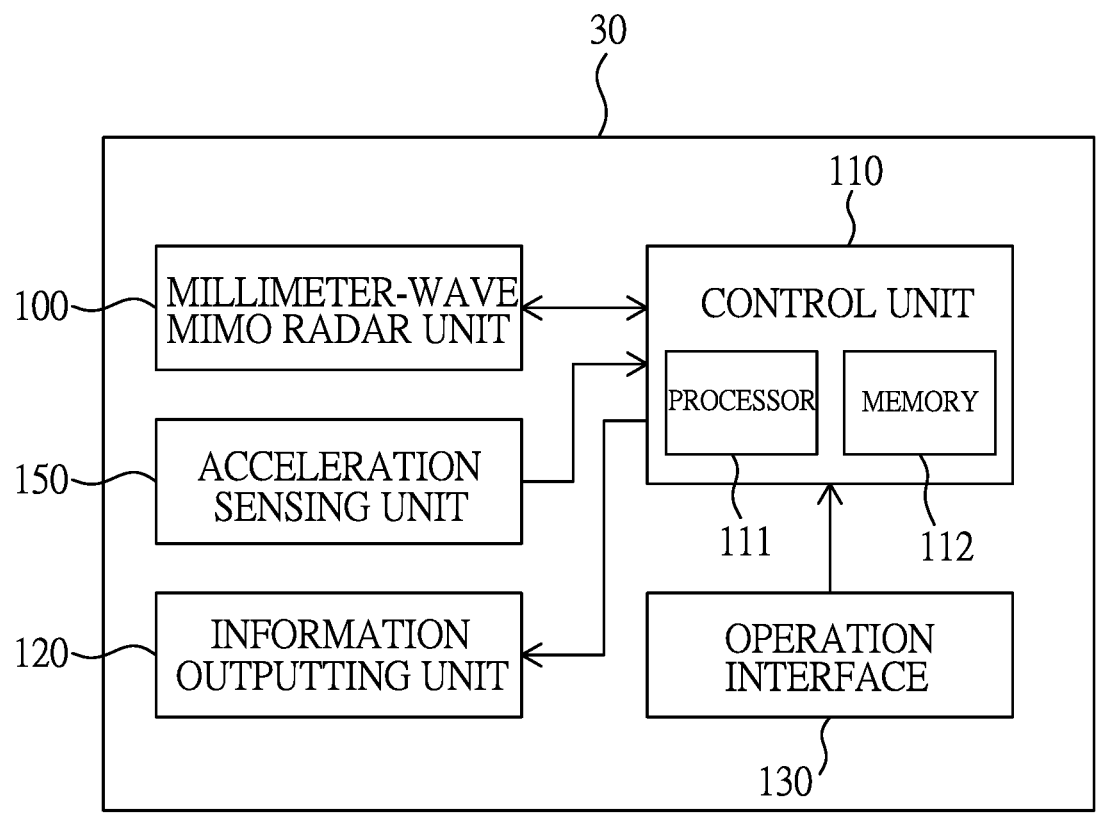
FIG. 3 is a block diagram illustrating the portable radar sensing device according to one another embodiment of the present invention.

Please refer to FIG. 3, which is a block diagram illustrating the portable radar sensing device according to one another embodiment of the present invention. As shown in FIG. 3, a portable radar sensing device 30 comprises a millimeter-wave MIMO radar unit 100, a control unit 110, at least one information outputting unit 120, an operation interface 130 and an acceleration sensing unit 150.

Because the functions of the millimeter-wave MIMO radar unit 100, the information outputting unit 120 and the operation interface 130 have already been illustrated in the prior embodiment with reference to FIG. 1, no further illustration is provided.

The control unit 110 includes at least one processor 111 and at least one memory 112. When in operation, the control unit 110 is coupled to the millimeter-wave MIMO radar unit 100, the acceleration sensing unit 150, the at least one information outputting unit 120 and the operation interface 130 for processing a biological detecting operation, and the biological detecting operation includes a space scanning operation and a biological target scanning operation. The space scanning operation is served to generate a space map according to a plurality of outputted signals of the millimeter-wave MIMO radar unit 100. The biological target scanning operation is served to identify at least one biological target in the space map according to the plural outputted signals of the millimeter-wave MIMO radar unit 100 and a plurality of outputted signals of the acceleration sensing unit 150. In addition, the control unit 110 can enable the displayer to display an augmented reality image for making a certain mark in a disaster scene to help the rescue personnel easily detect the biological target to be rescued. Moreover, the control unit 110 includes an artificial intelligence module for processing the biological detecting operation. Furthermore, the portable radar sensing device 30 can be worn on the rescue personnel.

Figure 4:
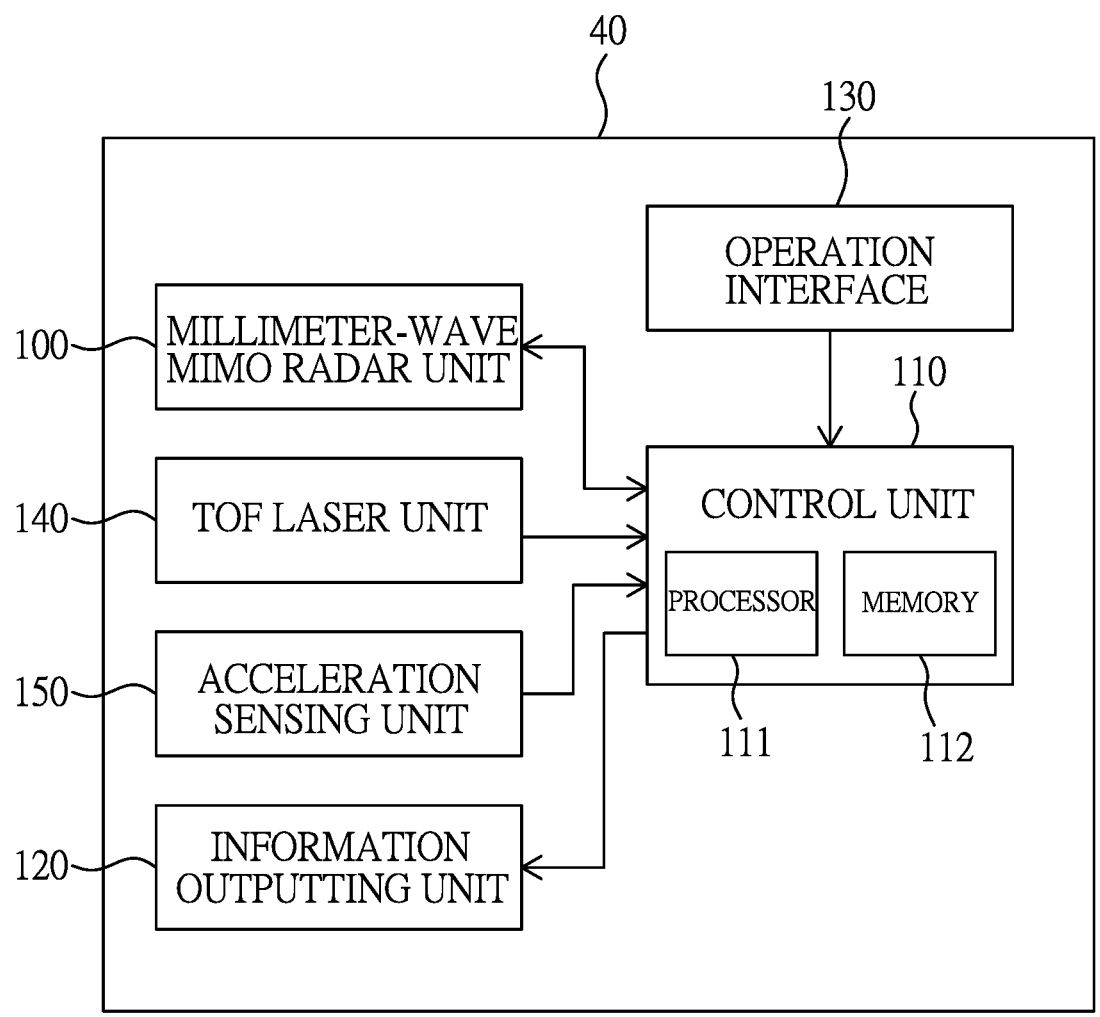
FIG. 4 is a block diagram illustrating the portable radar sensing device according to still one another embodiment of the present invention.
Figure 5:
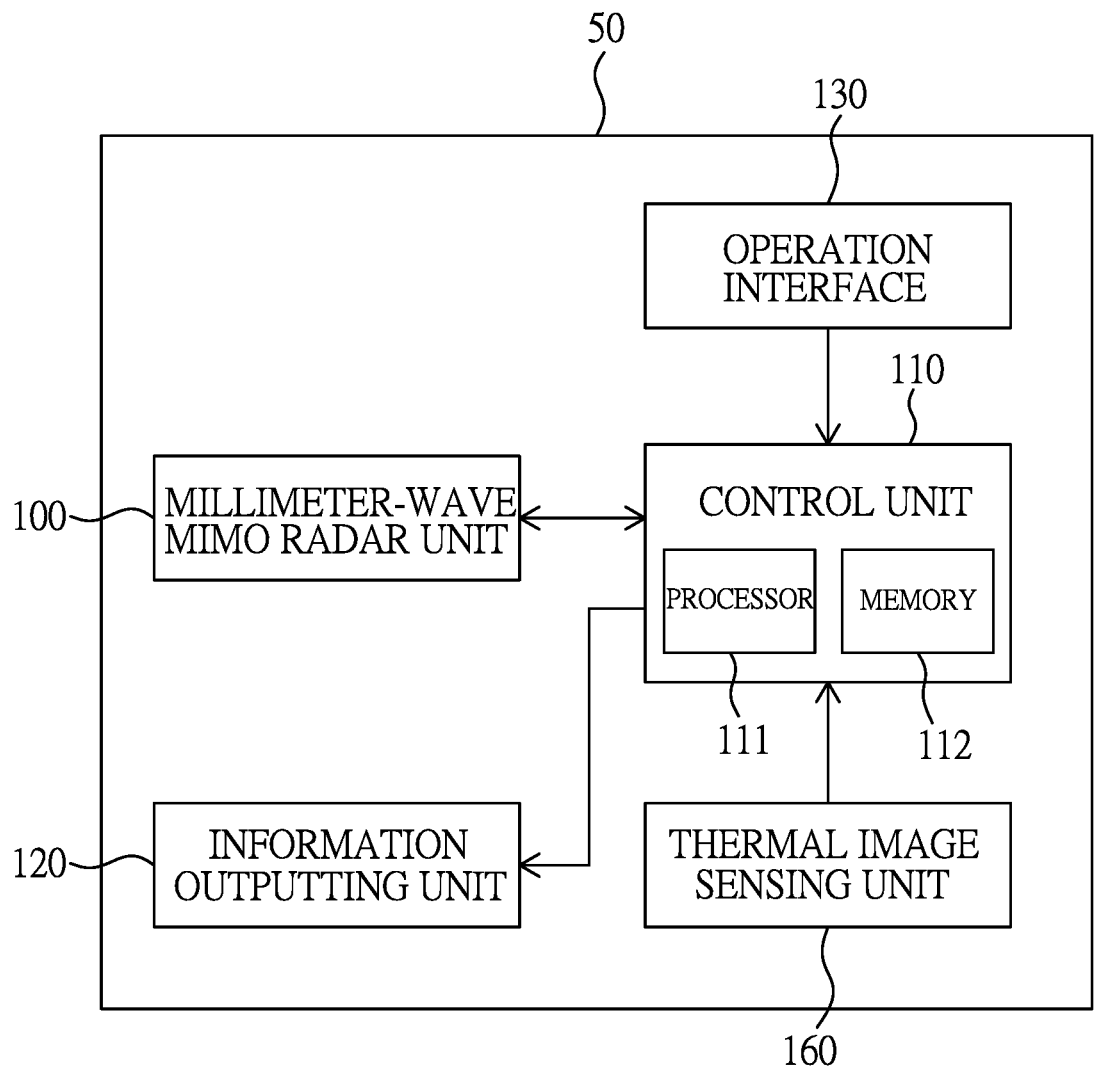
FIG. 5 is a block diagram illustrating the portable radar sensing device according to still one another embodiment of the present invention.
Figure 6:
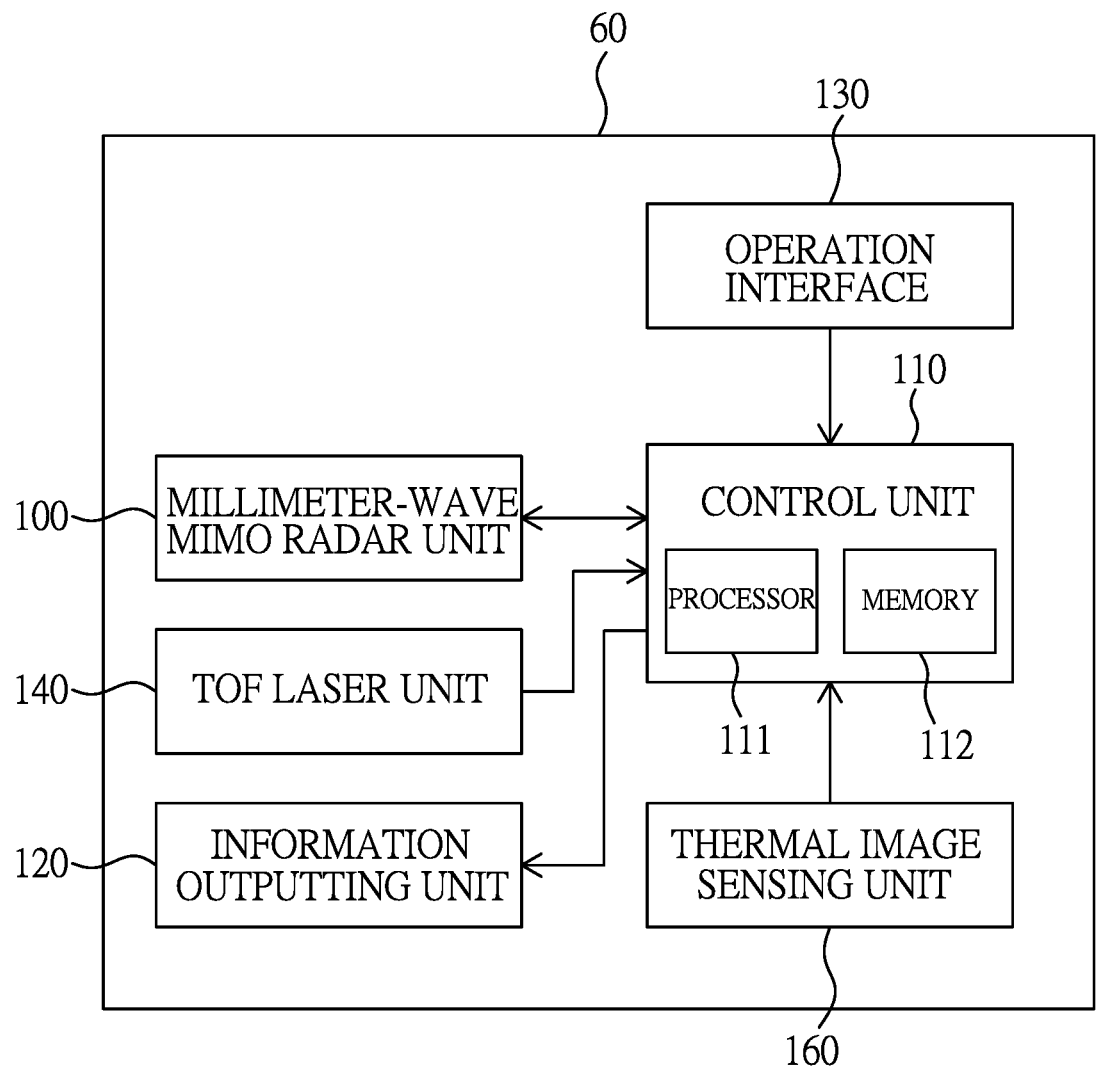
FIG. 6 is a block diagram illustrating the portable radar sensing device according to still one another embodiment of the present invention.
Figure 7:
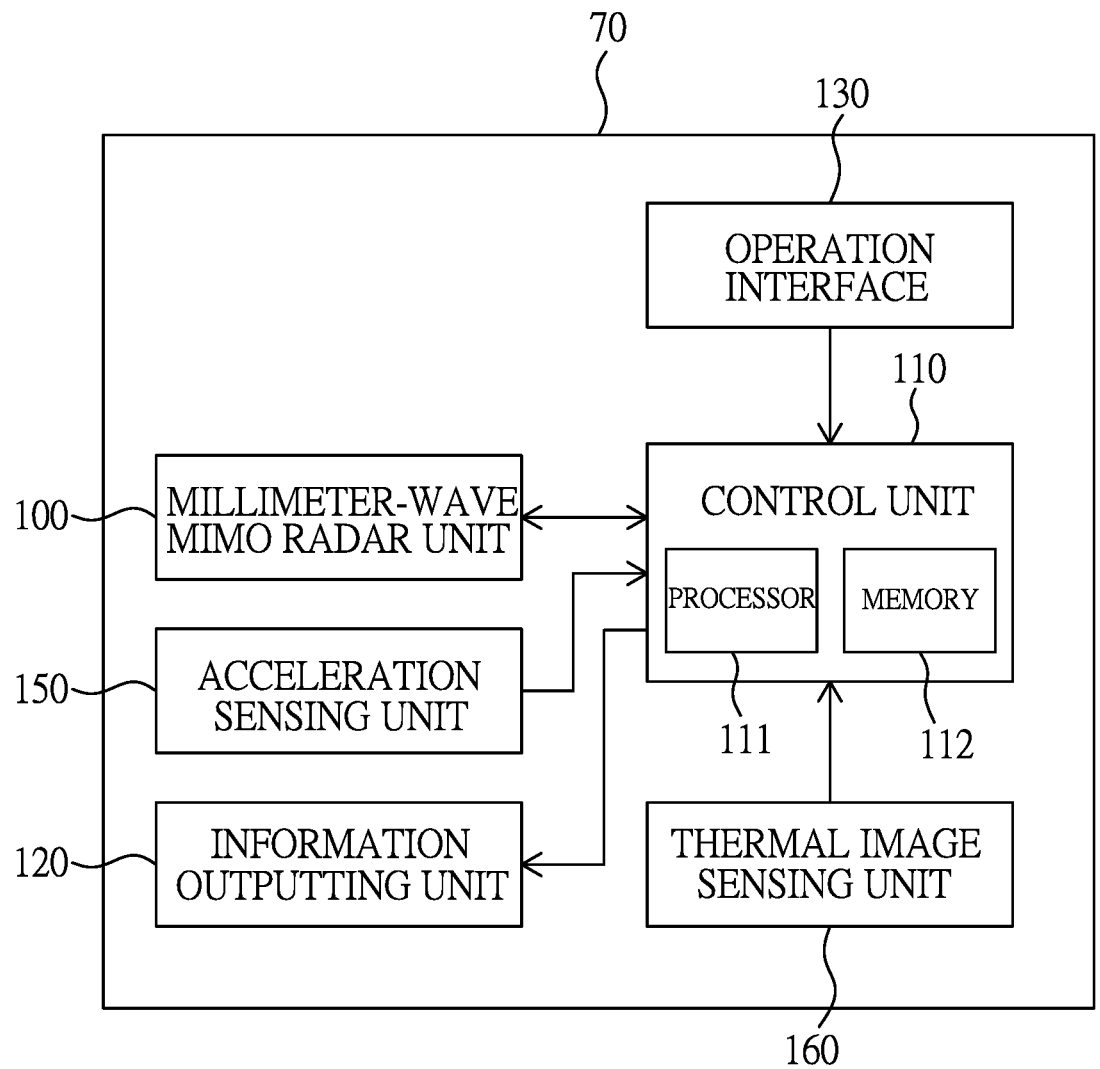
FIG. 7 is a block diagram illustrating the portable radar sensing device according to still one another embodiment of the present invention.
Figure 8:
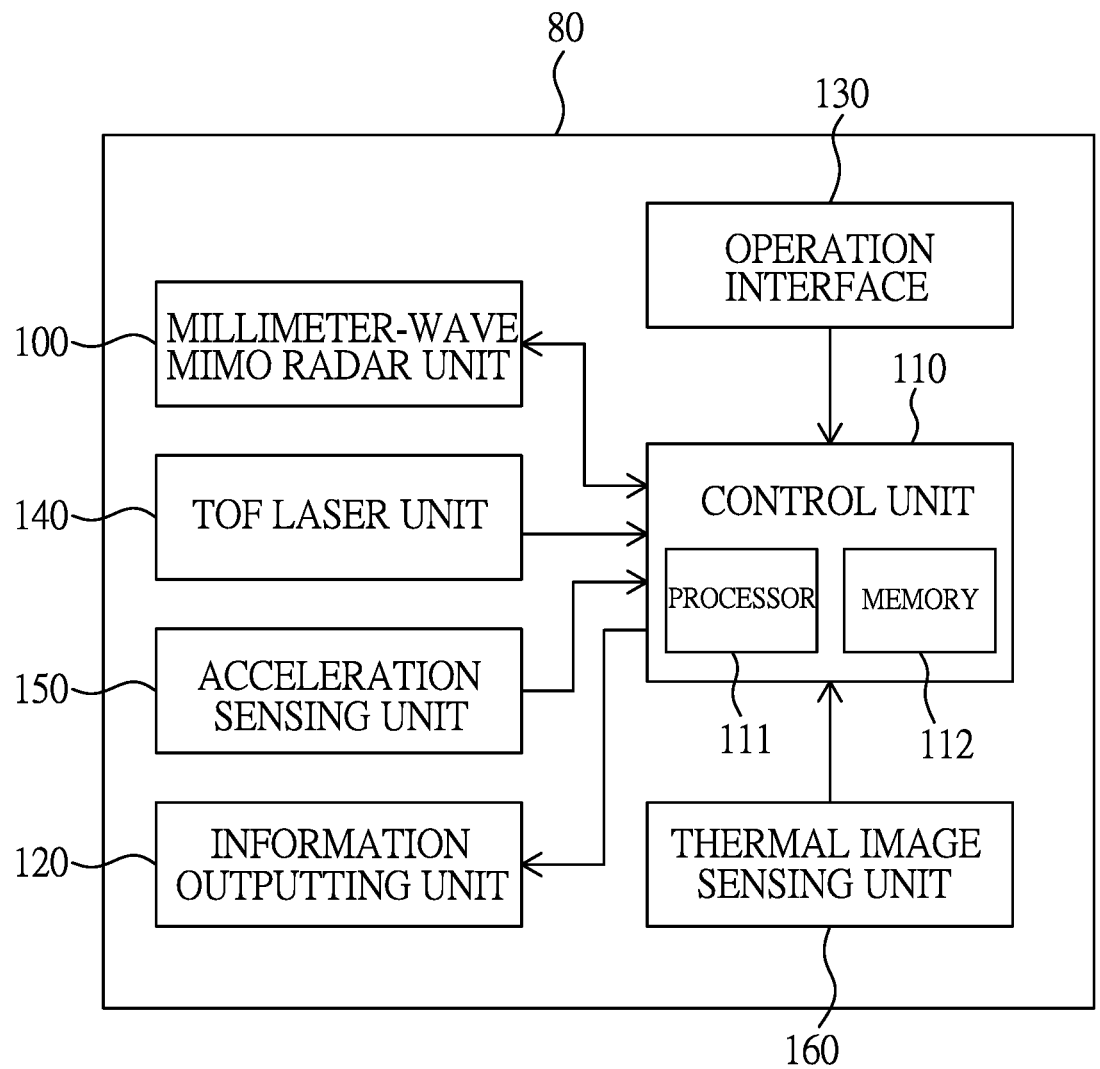
FIG. 8 is a block diagram illustrating the portable radar sensing device according to still one another embodiment of the present invention.

Please refer to FIG. 4, which is a block diagram illustrating the portable radar sensing device according to still one another embodiment of the present invention. As shown in FIG. 4, a portable radar sensing device 40 comprises a millimeter-wave MIMO radar unit 100, a control unit 110, at least one information outputting unit 120, an operation interface 130, a TOF laser unit 140 and an acceleration sensing unit 150.

Because the functions of the millimeter-wave MIMO radar unit 100, the information outputting unit 120 and the operation interface 130 have already been illustrated in the prior embodiment with reference to FIG. 1, no further illustration is provided.

The control unit 110 includes at least one processor 111 and at least one memory 112. When in operation, the control unit 110 is coupled to the millimeter-wave MIMO radar unit 100, the TOF laser unit 140, the acceleration sensing unit 150, the at least one information outputting unit 120 and the operation interface 130 for processing a biological detecting operation, and the biological detecting operation includes a space scanning operation and a biological target scanning operation. The space scanning operation is served to generate a space map according to a plurality of outputted signals of the millimeter-wave MIMO radar unit 100 and a plurality of outputted signals of the TOF laser unit 140. The biological target scanning operation is served to identify at least one biological target in the space map according to the plural outputted signals of the millimeter-wave MIMO radar unit 100 and the plural outputted signals of the TOF laser unit 140 and a plurality of outputted signals of the acceleration sensing unit 150. In addition, the control unit 110 can enable the displayer to display an augmented reality image for making a certain mark in a disaster scene to help the rescue personnel easily detect the biological target to be rescued. Moreover, the control unit 110 includes an artificial intelligence module for processing the biological detecting operation. Furthermore, the portable radar sensing device 40 can be worn on the rescue personnel.

Moreover, a thermal image sensing unit is adopted in the present invention for assisting the detection of the biological target. Please refer to FIG. 5-FIG. 8, which are block diagrams illustrating the portable radar sensing device according to four another embodiment of the present invention. As shown from FIG. 5 to FIG. 8, a control unit 110 adopted in a portable radar sensing device, 50, 60, 70, and 80 is coupled to a thermal image sensing unit 160 for processing the above-mentioned biological detecting operation.

Based on what has been disclosed above, advantages achieved by the present invention are as followings:

1. According to the portable radar sensing device provided by the present invention, the millimeter-wave MIMO radar unit can be served to detect the relative location of the biological target to be rescued in the disaster scene.
2. According to the portable radar sensing device provided by the present invention, the combination of the millimeter-wave MIMO radar unit and the TOF laser unit can be served to detect the relative location of the biological target to be rescued in the disaster scene.
3. According to the portable radar sensing device provided by the present invention, the combination of the millimeter-wave MIMO radar unit and the acceleration sensing unit can be served to detect the relative location of the biological target to be rescued in the disaster scene.
4. According to the portable radar sensing device provided by the present invention, the combination of the millimeter-wave MIMO radar unit, the TOF laser unit and the acceleration sensing unit can be served to detect the relative location of the biological target to be rescued in the disaster scene.
5. According to the portable radar sensing device provided by the present invention, the combination of the millimeter-wave MIMO radar unit and the thermal image sensing unit can be served to detect the relative location of the biological target to be rescued in the disaster scene.
6. According to the portable radar sensing device provided by the present invention, the combination of the millimeter-wave MIMO radar unit, the TOF laser unit and the thermal image sensing unit can be served to detect the relative location of the biological target to be rescued in the disaster scene.
7. According to the portable radar sensing device provided by the present invention, the combination of the millimeter-wave MIMO radar unit, the acceleration sensing unit and the thermal image sensing unit can be served to detect the relative location of the biological target to be rescued in the disaster scene.
8. According to the portable radar sensing device provided by the present invention, the combination of the millimeter-wave MIMO radar unit, the TOF laser unit, the acceleration sensing unit and the thermal image sensing unit can be served to detect the relative location of the biological target to be rescued in the disaster scene.
9. According to the portable radar sensing device provided by the present invention, the augmented reality image can be utilized for making a certain mark in the disaster scene to help the rescue personnel easily detect the biological target to be rescued.

10. According to the portable radar sensing device provided by the present invention, the artificial intelligence module can be utilized for processing the biological detecting operation.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific examples of the embodiments disclosed and that modifications and other embodiments are intended to be included within the scope of the appended claims. Although specific terms are employed herein, they are used in a generic and descriptive sense only and not for purposes of limitation.

What is claimed is:

1. A portable radar sensing device, comprising:
a millimeter-wave MIMO radar unit;
a control unit including at least one processor and at least one memory;
at least one information outputting unit; and
an operation interface;
wherein said control unit is coupled to said millimeter-wave MIMO radar unit, said at least one information outputting unit and said operation interface for processing a biological detecting operation, and said biological detecting operation includes a space scanning operation and a biological target scanning operation;
wherein said at least one information outputting unit includes at least on device selected from a group consisting of a displayer and a speaker;
wherein said operation interface includes at least on device selected from a group consisting of a button unit and a touch control unit;
wherein said at least one memory is served to store a biometric characteristic database for enabling the control unit to identify a biological type of a target;
wherein said space scanning operation is served to generate a space map according to a first plurality of outputted signals of said millimeter-wave MIMO radar unit; and
wherein said biological target scanning operation is served to identify at least one said biological type of at least one said target in said space map according to a second plurality of outputted signals of said millimeter-wave MIMO radar unit by referencing the biometric characteristic database.

2. The portable radar sensing device as claimed in claim 1, further including a thermal image sensing unit.

* * * * *